(12) United States Patent
Caldeira et al.

(10) Patent No.: US 8,871,121 B2
(45) Date of Patent: Oct. 28, 2014

(54) OPTICAL AND METAMATERIAL DEVICES BASED ON REACTIVE COMPOSITE MATERIALS

(75) Inventors: Kenneth G. Caldeira, Redwood City, CA (US); Peter L. Hagelstein, Carlisle, MA (US); Roderick A. Hyde, Redmond, WA (US); Muriel Y. Ishikawa, Livermore, CA (US); Edward K. Y. Jung, Bellevue, WA (US); Jordin T. Kare, Seattle, WA (US); Nathan P. Myhrvold, Medina, WA (US); Thomas J. Nugent, Jr., Issaquah, WA (US); John Brian Pendry, Cobham (GB); David Schurig, Raleigh, NC (US); Clarence T. Tegreene, Bellevue, WA (US); Charles Whitmer, North Bend, WA (US); Lowell L. Wood, Jr., Bellevue, WA (US)

(73) Assignee: The Invention Science Fund I LLC

( * ) Notice: Subject to any disclaimer, the term of this patent is extended or adjusted under 35 U.S.C. 154(b) by 1696 days.

(21) Appl. No.: 12/290,016

(22) Filed: Oct. 23, 2008

(65) Prior Publication Data

US 2010/0104820 A1    Apr. 29, 2010

(51) Int. Cl.
  *B29D 11/00*    (2006.01)
(52) U.S. Cl.
  USPC .................. 264/1.24; 264/1.25; 264/1.32
(58) Field of Classification Search
  USPC .............. 264/1.1, 1.21, 1.24, 1.27, 1.37, 1.7, 264/1.31, 1.32, 1.25
  See application file for complete search history.

(56) References Cited

U.S. PATENT DOCUMENTS

| | | | |
|---|---|---|---|
| 3,660,182 | A | 5/1972 | Cook et al. |
| 3,816,952 | A | 6/1974 | Niebyski et al. |
| 4,317,769 | A | 3/1982 | Saito et al. |
| 4,909,842 | A | 3/1990 | Dunmead et al. |
| 5,381,944 | A | 1/1995 | Makowiecki et al. |
| 5,536,947 | A | 7/1996 | Klersy et al. |
| 5,538,795 | A | 7/1996 | Barbee, Jr. et al. |
| 5,547,715 | A | 8/1996 | Barbee, Jr. et al. |
| 6,055,180 | A | 4/2000 | Gudesen et al. |
| 6,991,855 | B2 | 1/2006 | Weihs et al. |
| 7,020,006 | B2 | 3/2006 | Chevallier et al. |
| 7,143,568 | B2 | 12/2006 | Van Heerden et al. |
| 7,186,998 | B2 | 3/2007 | Ovshinsky et al. |
| 7,358,823 | B2 | 4/2008 | Abadeer et al. |
| 7,459,933 | B2 | 12/2008 | Mouttet |
| 7,644,854 | B1 | 1/2010 | Holmes et al. |
| 7,763,552 | B2 | 7/2010 | Tong et al. |
| 7,855,435 | B2 | 12/2010 | Klostermann et al. |
| 7,910,904 | B2 | 3/2011 | Kuo et al. |

(Continued)

FOREIGN PATENT DOCUMENTS

GB        893260 A       4/1962

OTHER PUBLICATIONS

UK Intellectual Property Office Examination Report Under Section 18(3); App. No. GB0918676.8; Aug. 5, 2011; pp. 1-3.

(Continued)

*Primary Examiner* — Mathieu D. Vargot

(57) ABSTRACT

Devices and components that can interact with or modify propagation of electromagnetic waves are provided. The design, fabrication and structures of the devices exploit the properties of reactive composite materials (RCM) and reaction products thereof.

21 Claims, 4 Drawing Sheets

(56) References Cited

U.S. PATENT DOCUMENTS

| | | | |
|---|---|---|---|
| 7,929,335 | B2 | 4/2011 | Gopalakrishnan |
| 7,969,770 | B2 | 6/2011 | Chen et al. |
| 7,994,034 | B2 | 8/2011 | Fournier et al. |
| 2003/0164289 | A1 | 9/2003 | Weihs et al. |
| 2003/0232179 | A1 | 12/2003 | Steenblik et al. |
| 2004/0213986 | A1 | 10/2004 | Kim et al. |
| 2006/0068179 | A1 | 3/2006 | Weihs et al. |
| 2007/0183919 | A1 | 8/2007 | Ayer et al. |
| 2007/0188385 | A1 | 8/2007 | Hyde et al. |
| 2010/0086750 | A1* | 4/2010 | Blumberg et al. ......... 428/195.1 |

OTHER PUBLICATIONS

Caloz, Christophe; Itoh, Tatsuo; *Electromagnetic Metamaterials: Transmission Line Theory and Microwave Applications*; bearing a date of Nov. 2005; ISBN: 0-471-75431-5; Wiley-IEEE Press.

Eleftheriades G. V.; Balmain, K. G; *Negative Refraction Metamaterials: Fundamentals Principles and Applications*; bearing a date of Jul. 7, 2005; ISBN: 0-471-60146-2; Wiley—IEEE Press.

Pendry, J.B.; "Negative Refraction Makes a Perfect Lens"; Physical Review Letters; bearing dates of Apr. 25, 2000, Oct. 30, 2000 and 2000; pp. 3966-3969; vol. 85, No. 18; The American Physical Society.

Smith, D.R.; Pendry, J.B.; Wiltshire, M.C.K.; Review: Metamaterials and Negative Refractive Index; Science; bearing a date of Aug. 6, 2004; pp. 788-792; vol. 305; located at: www.sciencemag.org Smith, David R.; Rye, Patrick; Vier, David C.; Starr, Anthony F.; Mock, Jack J.; and Perram, Timothy; "Design and Measurement of Anisotropic Metamaterials that Exhibit Negative Refraction"; IEICE Trans. Electron; bearing dates of Sep. 3, 2003, Nov. 25, 2003, and Mar. 2004; pp. 359-370; vol. E87-C, No. 3.

Southwire Product Catalog; printed on Nov. 30, 2011; pp. 1-2; Southwire Company; http://www.southwire.com/products/ProductCatalog.htm.

"Installing a 3-Way Switch With Wiring Diagrams"; bearing a date of 2004 and printed on Nov. 29, 2011; pp. 1-5; The Home Improvement Web Directory; http://www.homeimprovementweb.com/information/how-to/three-way-switch.htm.

Combined Search and Examination Report dated Feb. 24, 2010; International App. No. GB0918676.8; pp. 1-6.

*Medimmune Ltd. V. Novartis Pharmaceuticals UK Ltd.*; England and Wales High Court 1669 (Pat); Jul. 5, 2011; pp. 1-134.

UK Intellectual Property Office Examination Report under Section 18(3); Application No. GB0918676.8; Aug. 9, 2012; pp. 1-2.

*Unilever* V. *Henkel*; European Patent Office Case No. T 0435/91 (Detergents); Mar. 9, 1994; pp. 1-6.

\* cited by examiner

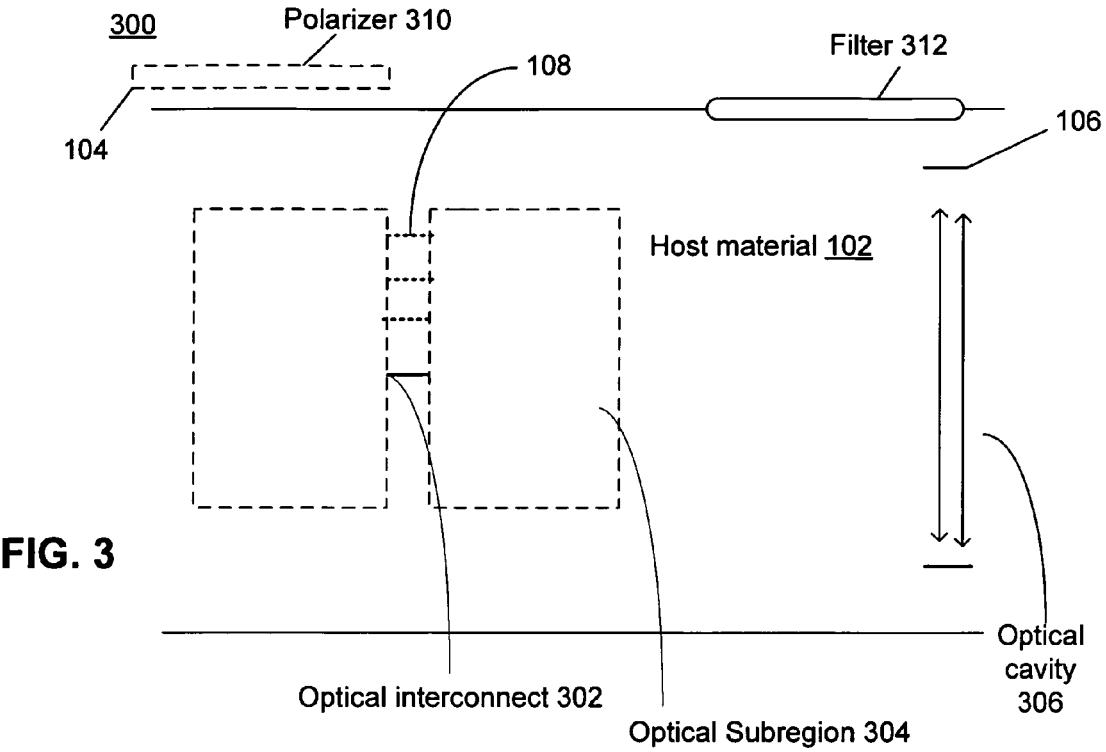
FIG. 3
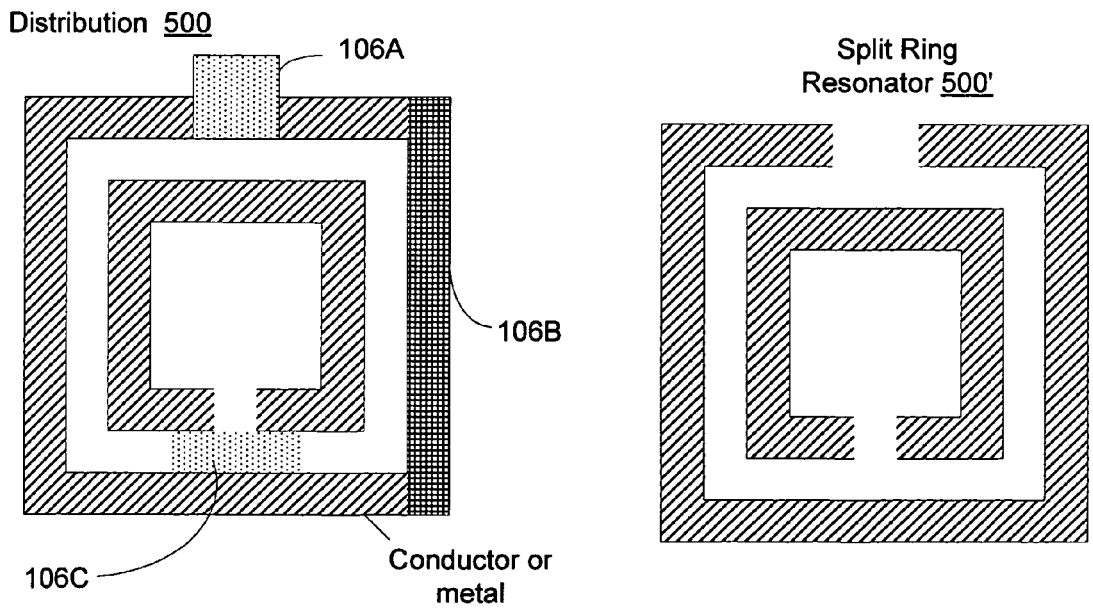
FIG. 5 RCM distribution in Metamaterial Component blank 100 for a split ring resonator device

FIG. 7

Method 700

---
710
Provide a host material in a region defining an optical component

---
720
Provide reactive composite material(s) (RCM) in or proximate to the region defining the optical component ---
730
Alter optical properties of the region by selectively reacting a portion of the RCM in or proximate to the region.

FIG. 8

METHOD 800

---
810
Dispose a plurality of RCM in or proximate to a region defining the metamaterial component ---
820
Form a particular arrangement of artificial structural elements by selectively reacting the RCM in or proximate to the region defining the metamaterial component, whereby the region exhibits metamaterial properties related to the particular arrangement of artificial structural elements.

OPTICAL AND METAMATERIAL DEVICES BASED ON REACTIVE COMPOSITE MATERIALS

BACKGROUND

Reactive composite materials (RCM) may include one or more reactive materials that react upon proper excitation. Exemplary RCM include powdered materials (e.g., powder compacts or mixtures) disposed in binders (e.g., epoxy). Other exemplary RCM include mechanically-shaped combinations of reactive materials (e.g., aluminum and nickel, and titanium and boron carbide).

The RCM may be disposed as layers, islands, or particles in a composite structure. A reaction that is suitably initiated at a starting location or point in the RCM may self-propagate through the RCM disposed in the composite structure changing the structural properties of the latter. For example, Weihs et al. U.S. Patent Application No. 20060068179 A1 describes electrical circuit fuses, which are made of RCM that undergo an exothermic chemical reaction and break-up to interrupt current flow in a circuit. Further, for example, Makowiecki et al. U.S. Pat. No. 5,381,944 Barbee et al. U.S. Pat. No. 5,538,795, and Van Heerden et al. U.S. Pat. No. 7,143,568 describe the use of the use of energy-releasing RCM for local joining (e.g., bonding, welding, soldering or brazing) of two bodies or objects. All of the aforementioned patents and patent application are incorporated by reference in their entireties herein.

Consideration is now being given to incorporating RCM in the design, fabrication and structure of devices that can interact with or modify propagation of electromagnetic waves. The devices of interest include devices for interacting with or modify propagation of electromagnetic waves in any part of the electromagnetic spectrum (e.g., visible, infrared, ultraviolet light; X-rays, microwaves, radio waves, and other forms of electromagnetic radiation).

SUMMARY

In one aspect, devices and components that can interact with or modify propagation of electromagnetic waves are provided. The design, fabrication and structures of the devices exploit the properties of reactive composite materials (RCM) and reaction products thereof.

A method for making, for example, an optical component, includes providing a host material in a region defining the optical component and providing reactive composite material(s) (RCM) in or proximate to the region. The method further includes altering optical properties of the region by selectively reacting a portion of the RCM in or proximate to the region.

A customizable optical component blank includes a host material and a pattern of RCM disposed in or proximate to the region defining the optical component blank. The pattern of RCM corresponds to one or more selectable optical component configurations.

An optical component includes a host material and reaction product material resulting from selectively reacted RCM disposed in or proximate to the region defining the optical component.

A method for making, for example, a metamaterial optical component, includes disposing a plurality of RCM in or proximate to a region defining the metamaterial component, forming a particular arrangement of artificial structural elements by selectively reacting the RCM in or proximate to the region defining the metamaterial component. The region exhibits metamaterial properties related to the particular arrangement of artificial structural elements.

A customizable metamaterial component blank includes a pattern of RCM disposed in or proximate to a region defining the metamaterial component blank. The pattern of RCM corresponds to one or more selectable metamaterial component configurations of artificial structural elements.

A metamaterial component includes a particular arrangement of artificial structural elements that provide metamaterial properties to the metamaterial component. The particular arrangement of artificial structural elements includes reaction product material resulting from selectively reacted RCM disposed in or proximate to a region defining the metamaterial component.

The foregoing summary is illustrative only and is not intended to be limiting. In addition to the illustrative aspects, embodiments, and features described above, further aspects, embodiments, and features of the solutions will become apparent by reference to the drawings and the following detailed description.

BRIEF DESCRIPTION OF THE FIGURES

In the accompanying drawings:

FIG. 3 is a schematic illustration of the optical component blank of FIG. 1 in selected portions of the RCM are reacted to make in to make an interconnect between two optical subregions, a filter, a polarizer and an optical cavity, in accordance with the principles of the solutions described herein;

FIG. 5 is a schematic illustration of an exemplary pattern of RCM distribution corresponding to a split ring resonator (SRR) device in a metamaterial component blank, in accordance with the principles of the solutions described herein;

FIGS. 7 and 8 are schematic illustrations of exemplary methods for making optical components and metamaterial components using reactive composite materials in accordance with the principles of the solutions described herein.

Throughout the figures, unless otherwise stated, the same reference numerals and characters are used to denote like features, elements, components, or portions of the illustrated embodiments.

DESCRIPTION

Figure 1:
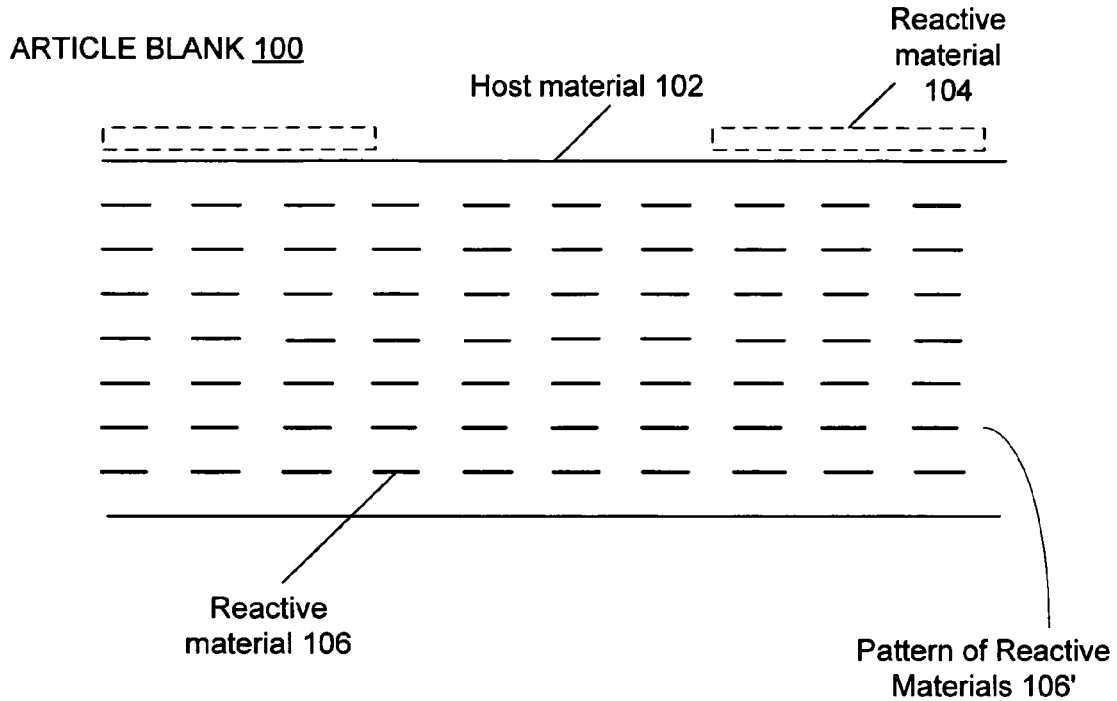
FIG. 1 is a schematic illustration of an exemplary optical component blank including reactive composite materials (RCM) arranged in a selected pattern, in accordance with the principles of the solutions described herein.

In the following description of exemplary embodiments, reference is made to the accompanying drawings, which form a part hereof. It will be understood that embodiments described herein are exemplary, but are not meant to be limiting. Further, it will be appreciated that the solutions described herein can be practiced or implemented by other than the described embodiments. Modified embodiments or alternate embodiments may be utilized, in the sprit and scope of the solutions described herein.

Devices and components, which can interact with or modify propagation of electromagnetic waves, are provided. The design, fabrication and structures of the devices exploit properties of reactive composite materials (RCM) and their reaction products.

The devices, examples of which are described herein, may be configured to interact with or modify propagation of electromagnetic waves in any part of the electromagnetic spectrum (e.g., visible, infrared, ultraviolet, X-rays, microwaves, radio waves, and other forms of electromagnetic radiation). For convenience in nomenclature, all such devices may be referred to hereinafter as "optical components," regardless of the particular wavelength(s) at which the devices operate or are configured to operate. Further, the devices may include devices whose interaction with electromagnetic waves is a direct function of the native electromagnetic properties (e.g., permittivity and permeability) of constituent materials in the device, and also devices whose interaction with electromagnetic waves is additionally a function of the properties resulting from artificial structuring of the constituent materials. For convenience in nomenclature, the latter type of devices may be referred to hereinafter as "metamaterial components." Metamaterial components having artificial structural elements may exhibit unusual properties (e.g., negative permittivity and/or permeability) at wavelengths that are, for example, several times larger than a spacing between the artificial structural elements in the components.

Metamaterials and their applications have been described, for example, in Pendry, et al., "Negative Refraction Makes a Perfect Lens", Phys. Rev. Lett. 85, 3966-3969 (2000), D. R. Smith et al., "Metamaterials and negative refractive index," Science, 305, 788 (2004), D. R. Smith et al., "Design and measurement of anisotropic metamaterials that exhibit negative refraction," IEICE Trans. Electron., E87-C, 359 (2004). All of the aforementioned publications are incorporated by reference in their entireties herein.

FIGS. 1-6 show exemplary optical and metamaterial component structures (100-600) that include RCM and/or RCM reaction products in or proximate to regions defining the components. The RCM may include reactive powdered materials (e.g., powder compacts or mixtures) disposed in binders (e.g., epoxy). Other exemplary RCM may include mechanically-shaped combinations of reactive materials including, for example, one or more of reactive metals, metal oxides, Ba, carbon and its compounds, Ca, Ce, Cr, Co, Fe, Hf, Mg, Mn, Mo, Nb, Ni, Si, Ta, Ti, Th, V, W, and Zr. Mo, Cu, Ti, Zr, Hf, V, Nb, Ta, Ni, Pd, Rh, Ni. Zr, B, C, Si, Al, $Fe_2O_3$, $Cu_2O$, $MoO_3$, FeCo, $FeCoO_x$, a carbide, a nitride, monel, an alloy, a metallic glass, or a metal ceramic.

The RCM assembled or incorporated in the components may have any suitable form (e.g., multilayers, islands, particles, nanofoils etc.). Further, any suitable fabrication method may be used to assemble or fabricate the RCM. The suitable method may include mechanical shaping (e.g., milling, machining, swaging, rolling, pressing, etc.) and/or physical and chemical deposition and etching (e.g., chemical vapor deposition, sputter deposition, etc.) Likewise, any suitable fabrication technique may be used to assemble or incorporate RCM in a component (e.g., in a host material of the component).

The type and shape of RCM incorporated in a component may be suitably selected, for example, in consideration of the contribution of the material properties of the RCM (and its products) to the component's electromagnetic behavior, and/or in consideration of the reactive properties of the RCM (e.g., heats of reaction, reaction self-propagation velocity, nature and form or reaction products). See e.g., M. E. Reiss, C. M. Esber, D. Van Heerden, A. J. Gavens, M. E. Williams, and T. P. Weihs, "Self-propagating formation reactions in Nb/Si multilayers," Mater. Sci. Eng., A 261, 217 (1999), which is incorporated by reference in its entirety herein. The cited reference describes self-propagating formation reactions in Nb/Si multilayers and demonstrates that their reaction velocities decrease as the individual Nb and Si layers thicken.

Further, the type and shape of RCM incorporated in the incorporated in a component may be selected in consideration of the suitability of applicable reaction initiation methods (e.g., ignition by electrical spark, pressure, electromagnetic pulses etc.).

FIG. 1 shows an exemplary customizable optical component blank 100, which includes a host material 102 in a region defining the blank. The host material may be any suitable material (e.g., glass, epoxy, etc.), which is transparent, for example, at electromagnetic wavelengths selected for component operation. One or more RCM elements (102 and 106) are disposed in or proximate to the region defining the optical component blank. The RCM elements are disposed in a pattern 106' corresponding to one or more selectable optical component configurations that can be obtained by selectively reacting the RCM elements. At least one of the selectable optical component configurations may correspond to a transmissive optical component including, but not limited to a lens, a grating, a filter, a polarizer, a waveguide, an optical cavity, an optical interconnect, and/or an interferometer.

With reference to FIG. 1, a 2-dimensional pattern 106' of RCM elements 106, which have rectangular cross sectional shapes, is disposed in host material 102 of optical component blank 100. It will be understood that 2-dimensional pattern 106' shown in FIG. 1 is only exemplary. In general, RCM pattern 106' may have any suitable dimensions (e.g. 1-D, 2-D or 3D). Further, it will be understood that RCM elements 106 may have any suitable shape based, for example, on optical component design and customization considerations. For example, RCM element 106 may be a Ni/Si RCM nanofoil that has an increasing thickness along an axis with a view to have correspondingly decreasing reaction velocities along the axis. In general, RCM elements 106 may have any one or more dimensional, simple or complex shapes. Likewise, RCM elements 106 may have any suitable form. One or more RCM elements 106 may, for example, be in the form of layers, reactive nanofoils, islands, and/or particles disposed in the region defining the optical component.

One or more RCM elements 106 may be disposed in an interconnection region between two optical subregions in the optical component. Upon reaction, such RCM elements 106 may optically connect or disconnect the two optical subregions.

Optical component blank 100 may be configured so that a reaction can be started or initiated in selected portions of RCM pattern 106' (and/or proximate RCM elements 104) by any suitable technique (e.g., a spark or ignition pulse, an applied energy pulse, an optical energy pulse, applied pressure, etc.). A reaction that is started or initiated in a portion of RCM pattern 106' and/or RCM elements 104 may sustain itself by self-propagate to other portions of RCM pattern 106 in a controlled manner according to the structure and composition of the RCM.

The reaction may result in changes in the composition of blank 100. For example, a dielectric constituent may change into a metal, a metal may change into a dielectric material, and/or one dielectric constituent may change into another dielectric material upon reaction. Further, the reaction may result in changes in the structure of blank 100 due to, for example, differences in volumes of pre- and post-reacted RCM, and/or heat absorbed or generated in the reaction.

The changes in composition and structure of blank 100 upon reaction may be in the RCM constituents and/or the host material constituents. For example, the RCM reaction may generate exothermic heat (or absorb endothermic heat) to modify properties (e.g., dielectric properties) of host material portions adjoining the RCM. Further, for example, the RCM reaction may result in diffusion, mixing and/or chemical reaction of material species between the RCM and host material 110.

One or more optical properties of the region defining optical component blank 100 may be responsive to a reaction of the RCM therein. The optical properties that are affected or depend upon a state of the RCM (e.g., reacted or unreacted) include, for example, a permittivity, an index of refraction, an absorption coefficient, a spectral property, a transmission property, or an optical confinement property of the region. The property may be an RF, MW, THz, IR, visible, and/or UV property. Likewise, one or more mechanical or structural properties (e.g., shape, size, elasticity, volume, density, and/or crystallinity) of optical component blank 100 may be responsive to a reaction of the RCM therein.

An optical component formed selectively customizing optical component blank 100 may be a transmissive optical component. Further, the optical component may include simple or complex optical devices or structures (e.g., a lens, a grating, a waveguide, an optical cavity, an optical interconnect, a filter, a polarizer, an interferometer, etc.), which may operate at one or more selected electromagnetic wavelengths.

Figure 2:
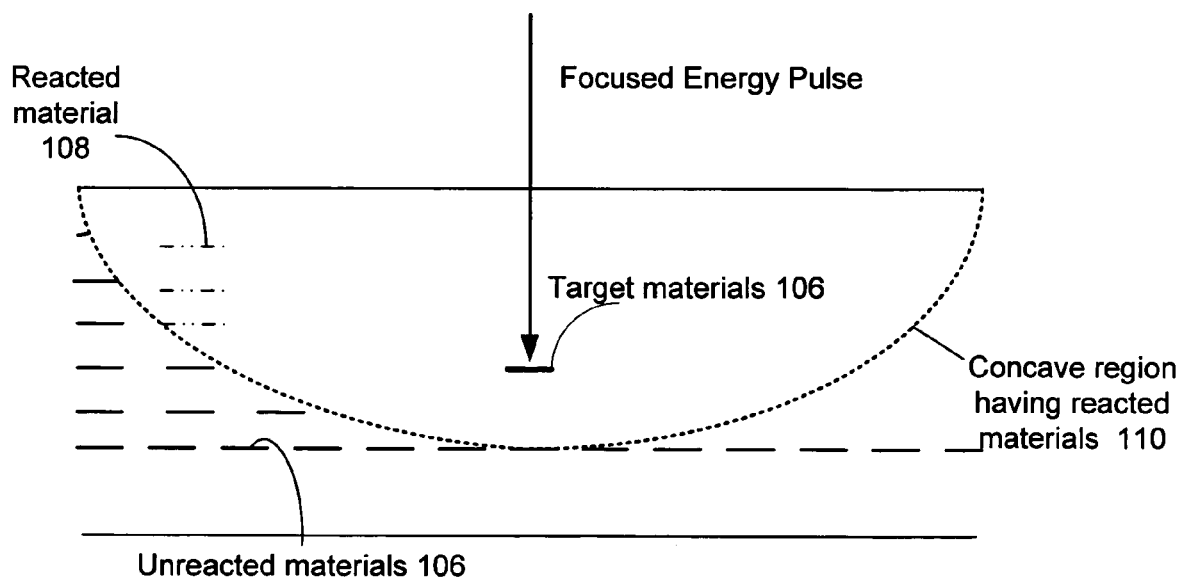
FIG. 2 is a schematic illustration of an exemplary customized optical component fabricated, for example, selectively reacting the RCM in the optical component blank of FIG. 1, in accordance with the principles of the solutions described herein.

FIGS. 2 and 3 show exemplary optical components that may be obtained by selectively reacting RCM elements 106 in optical component blank 100. FIG. 2 shows, for example, an optical component 200 having a plano lens-like structure obtained by selectively reacting RCM elements 106 in a concave region 110 of blank 100. A reaction in a RCM element 106 in a concave region 110 may be initiated by selectively applying energy pulses, sparks, or pressure to blank 100. FIG. 2 shows for example, an energy pulse focused to a selected depth to initiate a reaction in a target RCM element 106. FIG. 2 also schematically shows reacted material 108 resulting from reaction of target RCM elements 106 in region 110. It will be understood that reacted material 108 as shown schematically in FIG. 2 represents material and/or structural changes in both RCM and host material in region 110.

Like FIG. 2, FIG. 3 shows an optical component 300, which may be obtained from blank 100 by selectively reacting portions of RCM pattern 106' and/or proximate RCM elements 104. Optical component 300, for example, includes optical interconnect 302 between two optical subregions 304, an optical cavity 306, a polarizer 310 and a filter 312. The optical devices or structures may be characterized or defined by either unreacted RCM elements or reacted RCM elements. For example, interconnect 302, which operates to optically interconnect subregions 304 at one or more electromagnetic wavelengths may be formed by an unreacted RCM element 106 as shown, for example, in FIG. 3. Alternatively, interconnect 302 may be formed of reaction products 108. In general, reaction product material 108 may optically connect or disconnect two optical subregions. In some instances, reaction product material 108 may merely attenuate an optical link between two optical subregions.

The optical devices or structures obtained by selectively reacting RCM in optical blank 100 may be characterized or defined by either unreacted RCM elements and/or reacted RCM elements. For example, optical cavity 306 ends may be unreacted RCM elements 106 as shown in FIG. 3. Further for example, polarizer 310 may include unreacted proximate RCM element 104, and filter 312 may include reaction products of a proximate RCM element 104 and host material 102.

It will be understood that blank 100 may also include pre-formed devices or devices structures (not shown) that are in addition to RCM elements 106. These preformed devices and device structures may be independent of devices structures formed by reacting RCM elements 106. Additionally or alternatively, the preformed devices and device structures may be modified by selectively reacting RCM elements 106.

The RCM reaction products and/or host material reaction products (e.g., reaction products 108 and filter 312) may include a reaction product of one or more of reactive metals, metal oxides, Ba, carbon and its compounds, Ca, Ce, Cr, Co, Fe, Hf, Mg, Mn, Mo, Nb, Ni, Si, Ta, Ti, Th, V, W, and Zr. Mo, Cu, Ti, Zr, Hf, V, Nb, Ta, Ni, Pd, Rh, Ni. Zr, B, C, Si, Al, $Fe_2O_3$, $Cu_2O$, $MoO_3$, FeCo, $FeCoO_x$, a carbide, a nitride, monel, an alloy, a metallic glass, or a metal ceramic. The reaction product(s) may be disposed in a multi-dimensional pattern in the region defining the optical component (e.g., component 200 and 300).

One or more optical properties of an optical component formed by customizing blank 100 by selectively reacting RCM therein are a function of the reaction product material left in the component. An optical property may, for example, be a permittivity, an index of refraction, an absorption coefficient, a conductivity, a magnetic susceptibility, a spectral property, a transmission property, or a reflection property of the region defining the component. The optical property may be a RF, MW, THz, IR, visible, and/or UV property. Further, mechanical and or structural properties (e.g., shape, elasticity, size, density, crystallinity, etc.) of the optical component are a function of the reaction product material left in the component.

Figure 4:
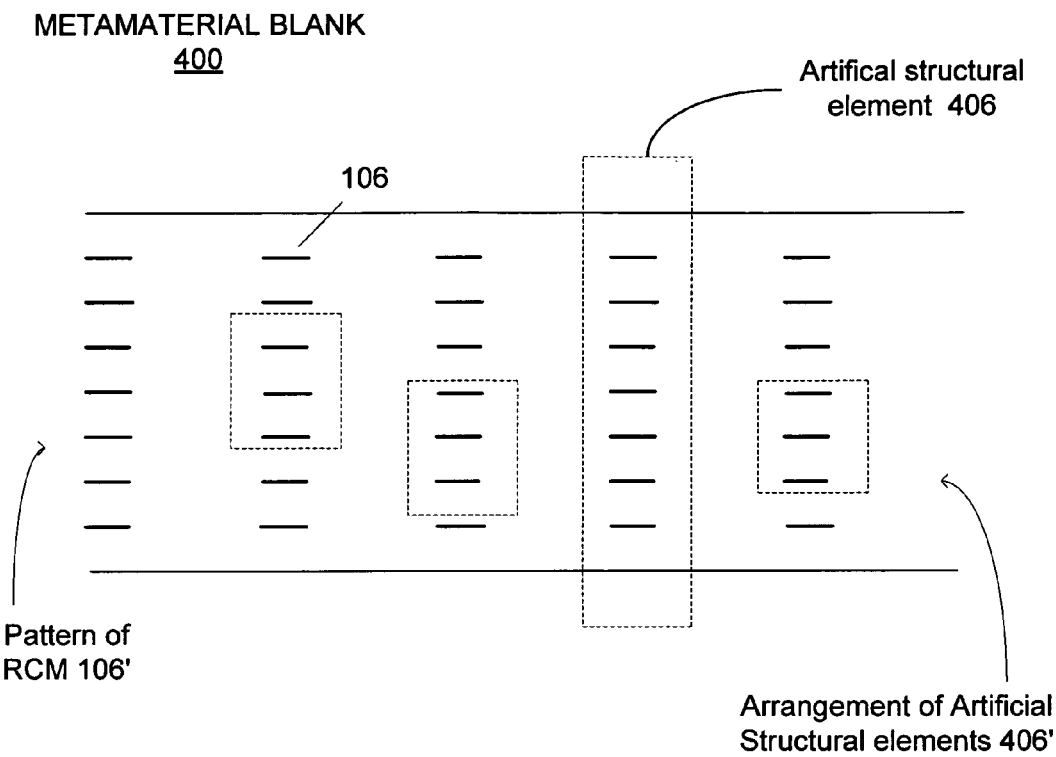
FIG. 4 is a schematic illustration of an exemplary metamaterial component blank having a selected arrangement of artificial structural elements that include selected patterns of RCM, in accordance with the principles of the solutions described herein.
Figure 6:
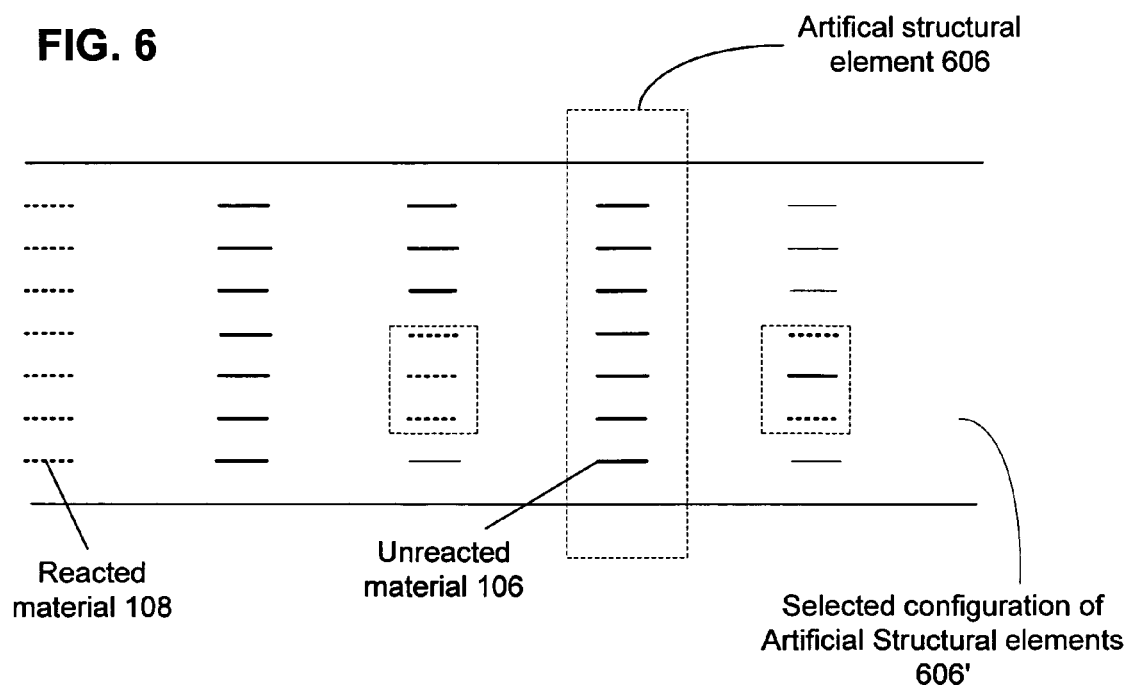
FIG. 6 is a schematic illustration of an exemplary customized metamaterial component fabricated, for example, selectively reacting the RCM in the metamaterial component blank of FIG. 4, in accordance with the principles of the solutions described herein.

Attention is now directed to metamaterials. FIGS. 4-6 show an exemplary metamaterial component blank 400, an exemplary RCM distribution 500 corresponding to a metamaterial device 500', and an exemplary metamaterial component 600, respectively.

Many structures and systems incorporating metamaterials employ discrete components (e.g., split ring resonators, oscillators, transmission lines, Swiss rolls, nanorods, fishnets, or similar structures). A range of illustrative metamaterial structures can be found in Christophe Caloz, Tatsuo Itoh, "Electromagnetic Metamaterials: Transmission Line Theory and Microwave Applications," ISBN: 0-471-66985-7, November 2005, Wiley-IEEE Press, G. V. Eleftheriades, K. G Balmain, "Negative-Refraction Metamaterials: Fundamental Principles and Applications," ISBN: 0-471-74474-3, August 2005, and V. M. Shalaev, "Optical Negative-Index Metamaterials," Nature Photonics, pp 41-48, Vol 1, January 2007. Further, commonly owned United States Patent Application publication No. 20070188385 A1 describes a variable metamaterial apparatus. All of the aforementioned publications and patent application are incorporated by reference in their entireties herein.

Exemplary metamaterial component blank 400, RCM distribution 500, and metamaterial component 600 may include or correspond to any of the illustrative metamaterial structures that are described in the incorporated references or other metamaterial structures.

With reference to FIG. 4, exemplary metamaterial component blank 400 includes a pattern 106' of RCM elements 106 disposed in or proximate to a region defining a metamaterial component. Pattern 106' of RCM elements 106 corresponds to one or more selectable metamaterial component configurations 406' of artificial structural elements 406. RCM elements 106 may include RCM having any suitable composition, shape or form (e.g., nanofoils, multilayers, islands, particles, etc.)

Artificial structural elements 406 may include at least one structural element having a dimension that is similar to or less than a selected wavelength at which a selected metamaterial component configuration exhibits metamaterial properties. The selected wavelength at which a selected metamaterial component configuration exhibits metamaterial properties may be in any part of the electromagnetic spectrum (e.g., a wavelength in the RF, MW, THz, IR, visible, or UV ranges of the electromagnetic spectrum). The artificial structural elements may include any suitable metamaterial component or part thereof (e.g., split ring resonators, oscillators, transmission lines, Swiss rolls, or similar structures).

RCM elements 106, which are disposed in metamaterial component blank 400, may correspond to all or any part of a metamaterial component or adjoining portions thereof. For example, when the metamaterial component is a split ring resonator, RCM elements 106 may correspond to all or part of a split ring, to portions between or adjoining the split rings, and/or to structures below or above a plane containing a split ring. FIG. 5 shows, for example, an exemplary disposition of RCM elements 106A, B and C corresponding to metamaterial component device 500, which is a split ring resonator having inner and outer annular split rings. It will be noted that RCM elements 106 in metamaterial component blank 400 may be of different types (e.g. RCM elements 106A, B and C).

Like the RCM elements 106 optical component blank 400, RCM elements in metamaterial component blank 400 may be selectively applying energy pulses, sparks, and/or pressure to blank 400 to initiate a controlled reaction (e.g., a self-propagating reaction) therein. Like a RCM reaction in optical blank 100, the reaction in blank 400 may result in changes in the composition of blank 400. For example, a dielectric constituent may change into a metal, a metal may change into a dielectric material, and/or one dielectric constituent may change into another dielectric material upon reaction. For example, with reference to FIG. 5, RCM element 106A may change from a metal into a dielectric, RCM element 106B may change from dielectric to a metal, and RCM element 106C may change from one dielectric to another dielectric. Further, the reaction may result in changes in the structure of blank 400 due to, for example, differences in volumes of pre- and post-reacted RCM and adjoining portions, and/or heat absorbed or generated in the reaction.

Physical (including in some cases electromagnetic), mechanical, and material properties (e.g., a permittivity, an index of refraction, anisotropy, an absorption coefficient, a gain, a conductivity, a magnetic susceptibility, a spectral property, a transmission property, or a reflection property, shape, size, crystallinity, etc.) of metamaterial component blank 400 may depend on a reaction state (e.g., reacted or unreacted) of the RCM. Accordingly, a metamaterial property exhibited by metamaterial component blank 400 at a selected electromagnetic wavelength can be a function of the reaction state of the RCM therein. RCM elements 106 in metamaterial component blank 400 may be selectively reacted to obtain a selected configuration 406' of artificial structure elements 406 that gives rise to a particular metamaterial property.

FIGS. 5 and 6 show exemplary metamaterial components/devices that may be obtained by selectively reacting RCM elements 106 in metamaterial component blank 400 to make material and/or structural changes in both RCM and/or host material regions of metamaterial component blank 400. The exemplary metamaterial components/devices include particular arrangements of artificial structural elements with at least one artificial structural element having a dimension that is less than a selected wavelength (e.g., a wavelength in the RF, MW, THz, IR, visible, or UV ranges of the electromagnetic spectrum) at which the component/devices exhibit metamaterial properties.

FIG. 5 shows exemplary split ring resonator device 500' that may be obtained, for example, by reacting RCM element 106A, 106B and 106C in distribution 500. Further, FIG. 6 shows exemplary metamaterial component 600 having a particular configuration 606' of artificial structural elements 606 that may be obtained by selectively reacting RCM elements 106 in metamaterial component blank 400. The particular configuration or arrangement 606' of artificial structural elements 606 may include only reacted materials 108, unreacted materials 106, or both, in addition to host materials which may be present in metamaterial component blank 400.

In both device 500' and 600, the particular arrangement of artificial structural elements gives rise to metamaterial properties of the metamaterial component. The particular arrangement of artificial structural elements includes reaction product material resulting from selectively reacted RCM disposed in or proximate to a region defining the metamaterial device or component and/or unreacted RCM material. The reaction product material resulting from selectively reacted RCM may, for example, alter pre-existing artificial structural elements in the region defining the metamaterial component, dielectric properties of an adjoining artificial structural element, and/or a volume occupied by the RCM.

Like in optical components 200 and 300, RCM and/or host material reaction products in metamaterial device 500' and component 600, may include a reaction product of one or more of reactive metals, metal oxides, Ba, carbon and its compounds, Ca, Ce, Cr, Co, Fe, Hf, Mg, Mn, Mo, Nb, Ni, Si, Ta, Ti, Th, V, W, and Zr. Mo, Cu, Ti, Zr, Hf, V, Nb, Ta, Ni, Pd, Rh, Ni. Zr, B, C, Si, Al, $Fe_2O_3$, $Cu_2O$, $MoO_3$, FeCo, $FeCoO_x$, a carbide, a nitride, monel, an alloy, a metallic glass, or a metal ceramic. The reaction product(s) may be disposed in a multi-dimensional pattern in the region defining the metamaterial device or component.

Methods for making optical and/or metamaterial devices and components may involve RCM materials. FIGS. 7 and 8 show exemplary methods 700 and 800 for making optical and metamaterial components, respectively.

FIG. 7 shows exemplary method 700 making an optical device or component based on RCM materials. Method 700 includes providing a host material in a region defining an optical component (710), providing RCM in or proximate to the region defining the optical component (720) and altering optical properties of the region by selectively reacting a portion of the RCM in or proximate to the region (730). The region may define a transmissive optical component. Further, the optical component may, for example, be a lens, a grating, a waveguide, an optical cavity, a polarizer, a filter, an optical interconnect, and/or an interferometer.

In method 700, altering optical properties of the region involves by selectively reacting a portion of the RCM according to a selected design or pattern for customizing the optical component. The altered optical properties may, for example, include a permittivity, an index of refraction, an absorption coefficient, a spectral property, a transmission property, and/ or an optical confinement property of the region. Further, reacting the RCM may alter mechanical and structural properties (e.g., shape, elasticity, density, crystallinity, volume or size) of the RCM and adjoining host material. The altered properties may be a RF, MW, THz, IR, visible, and/or UV property of the region.

Selectively reacting a portion of the RCM in or proximate to the region may involve initiating a self-propagating reaction in the RCM, for example, by applying a spark, an energy pulse, focusing energy to a selected depth in the region defining the optical component, and/or applying pressure. The reaction in the RCM may change a dielectric material into a metal or another dielectric material, and/or change a metal into a dielectric material or other conductor.

Further, in method 700, selectively reacting a portion of the RCM may generate exothermic heat (and/or absorb endothermic heat), which modifies properties (e.g. dielectric properties) of portions adjoining the RCM in the region. The modification may be because of heat transfer, and/or mixing or reaction of material species changing properties of portions adjoining the RCM in the region.

The RCM used in method 700 may include, for example, reactive metals and/or metal oxides, Ba, carbon and its compounds, Ca, Ce, Cr, Co, Fe, Hf, Mg, Mn, Mo, Nb, Ni, Si, Ta, Ti, Th, V, W, and Zr. Mo, Cu, Ti, Zr, Hf, V, Nb, Ta, Ni, Pd, Rh, Ni. Zr, B, C, Si, Al, $Fe_2O_3$, $Cu_2O$, $MoO_3$, FeCo, $FeCoO_x$, a carbide, a nitride, monel, an alloy, a metallic glass, or a metal ceramic. The RCM may be in any suitable form (e.g., as a multi-dimensional pattern, a multilayered structure, particles, islands, and/or reactive nanofoils).

In some implementations of method 700, disposing RCM may include disposing RCM in an interconnection region between two optical subregions in the optical component. The RCM disposed in the interconnection region may be responsive to optically connect or disconnect the two optical subregions upon reaction.

FIG. 8 shows an exemplary method 800 making a metamaterial device or component based on RCM materials. Method 800 may include disposing a plurality of RCM in or proximate to a region defining the metamaterial component (810), and forming a particular arrangement of artificial structural elements by selectively reacting the RCM so that the region exhibits metamaterial properties related to the particular arrangement of artificial structural elements (820).

At least one artificial structural element may have a dimension that is similar to or less than a selected wavelength (e.g., a wavelength in the RF, MW, THz, IR, visible, or UV ranges of the electromagnetic spectrum) at which the region exhibits metamaterial properties.

In method 800, forming a particular arrangement of artificial structural elements may involve forming adjoining structural elements having at least one different physical property (e.g. a permittivity, an index of refraction, an absorption coefficient, a conductivity, a magnetic susceptibility, a compositional property, a spectral property, a transmission property, or a reflection property) and may involve altering pre-existing artificial structural elements in the region.

Further in method 800, the types and/or forms of RCM used may be the same or similar to types and/or forms of RCM, which have been previously described herein (e.g., with reference to FIGS. 1-7). Likewise, in method 800 the techniques or processes for selectively reacting the RCM and results of the reaction may be the same or similar to those previously described herein (e.g., with reference to FIGS. 1-7).

While various aspects and embodiments have been disclosed herein, other aspects and embodiments will be apparent to those skilled in the art. It will be understood that the various aspects and embodiments disclosed herein are for purposes of illustration and are not intended to be limiting, with the true scope and spirit being indicated by the following claims. For example, methods 700 and 800 may include modifying properties of pre-existing optical and metamaterial devices, respectively, by reacting RCM and or host materials therein. Modification of pre-existing metamaterial devices or structures by reacting RCM and or host materials therein may allow users to control or customize the devices' metamaterial responses (e.g., wavelength or frequency, quality factor (Q)), etc.).

The invention claimed is:

1. A method, comprising:
providing a host material in a region defining an optical component;
providing reactive composite material(s) (RCM) in or proximate to the region defining the optical component; and
altering optical properties of the region by selectively reacting a portion of the RCM in or proximate to the region.

2. The method of claim 1, wherein providing a host material in a region comprises providing a host material in a region defining a transmissive optical component.

3. The method of claim 1, wherein the optical component is any one of a lens, a grating, a waveguide, a phase shifter, a polarizer, a filter, an optical cavity, an optical interconnect, and/or an interferometer.

4. The method of claim 1, wherein altering optical properties of the region comprises selectively reacting a portion of the RCM according to a selected design or pattern for customizing the optical component.

5. The method of claim 1, wherein altering the optical properties of the region comprises altering one or more of a permittivity, an index of refraction, an absorption coefficient, a spectral property, a transmission property, or an optical confinement property of the region.

6. The method of claim 1, wherein altering the optical properties of the region comprises altering the shape, elasticity, density, crystallinity, and/or size of the optical component.

7. The method of claim 1, wherein altering the optical properties of the region comprises altering one or more of a RF, MW, THz, IR, visible, and/or UV property of the region.

8. The method of claim 1, wherein selectively reacting a portion of the RCM in the region comprises applying an energy pulse to the RCM.

9. The method of claim 8, wherein applying an energy pulse comprises focusing energy to a selected depth in the region defining the optical component.

10. The method of claim 1, wherein selectively reacting a portion of the RCM comprises initiating a pressure-induced reaction in the RCM.

11. The method of claim 1, wherein selectively reacting a portion of the RCM comprises changing a dielectric material into a metal.

12. The method of claim 1, wherein selectively reacting a portion of the RCM comprises changing a metal into a dielectric material.

13. The method of claim 1, wherein selectively reacting a portion of the RCM comprises changing a dielectric material into another dielectric material.

14. The method of claim 1, wherein selectively reacting a portion of the RCM comprises generating exothermic heat to modify properties of portions adjoining the RCM in the region.

15. The method of claim 1, wherein selectively reacting a portion of the RCM comprises changing a volume occupied by the RCM.

16. The method of claim 1, wherein selectively reacting a portion of the RCM comprises changing dielectric properties of portions adjoining the RCM in the region.

17. The method of claim 1, wherein providing the RCM comprises providing reactive metals and/or metal oxides in the region defining the optical component.

18. The method of claim 1, wherein providing the RCM comprises providing at least one of Ba, carbon and its compounds, Ca, Ce, Cr, Co, Fe, Hf, Mg, Mn, Mo, Nb, Ni, Si, Ta, Ti, Th, V, W, Zr, Cu, Pd, Rh, B, Al, $Fe_2O_3$, $Cu_zO$, $MoO_3$, FeCo, $FeCoO_x$, a carbide, a nitride, monel, an alloy, a metallic glass, or a metal ceramic.

19. The method of claim 1, wherein providing the RCM comprises providing RCM in an interconnection region between two optical subregions in the optical component.

20. The method of claim 1, wherein providing the RCM comprises providing RCM in a multi-dimensional pattern in the region defining the optical component.

21. The method of claim 1, wherein providing the RCM comprises providing multilayered RCM in the region defining the optical component.

\* \* \* \* \*